US012716472B1

(12) United States Patent
Rey

(10) Patent No.: US 12,716,472 B1
(45) Date of Patent: Aug. 25, 2026

(54) ACTUATOR ASSEMBLY WITH REDUNDANT DRIVERS AND LINKAGES TO MITIGATE FAULT CONDITIONS

(71) Applicant: Solient LLC, Torrance, CA (US)

(72) Inventor: Gonzalo J. Rey, Torrance, CA (US)

(73) Assignee: Solient LLC, Torrance, CA (US)

( * ) Notice: Subject to any disclaimer, the term of this patent is extended or adjusted under 35 U.S.C. 154(b) by 448 days.

(21) Appl. No.: 18/515,671

(22) Filed: Nov. 21, 2023

Related U.S. Application Data

(60) Provisional application No. 63/384,677, filed on Nov. 22, 2022.

(51) Int. Cl.
*F16H 21/02* (2006.01)
*B64C 13/50* (2006.01)

(52) U.S. Cl.
CPC .......... *F16H 21/02* (2013.01); *B64C 13/505* (2018.01)

(58) Field of Classification Search
CPC .............................. F16H 21/02; B64C 13/505
USPC .......................................................... 700/275
See application file for complete search history.

(56) References Cited

U.S. PATENT DOCUMENTS 11,248,698 B2 * 2/2022 Kopp ...................... B64C 13/30
11,680,616 B2 6/2023 Manzanares et al.
2003/0183728 A1 * 10/2003 Huynh .................. B64C 13/345 244/224
2006/0255207 A1 * 11/2006 Wingett ................ B64C 13/504 244/99.4
2014/0005862 A1 * 1/2014 Shue .................. G05B 19/0428 701/3
2014/0360348 A1 * 12/2014 Kopp ...................... F15B 15/06 91/159

FOREIGN PATENT DOCUMENTS

WO 2008047066 A1 4/2008

OTHER PUBLICATIONS

Chenoweth, C. C., D. M. Fain, and C. I. Svensson. Redundant actuator development program. No. D6-46457. 1975. (Year: 1975).*

* cited by examiner

*Primary Examiner* — Mohammad Ali
*Assistant Examiner* — Joshua T Sanders
(74) *Attorney, Agent, or Firm* — Amsel IP Law PLLC; Jason Amsel

(57) ABSTRACT

An actuator assembly provides redundancy to maintain operation when a driver link is inoperable due to jamming or breakage of a prime mover, gear, link, or other drivetrain component. The actuator assembly includes a first motor and a second motor that each generate rotational forces. A first driver link is coupled to the first motor and to a first output link. Similarly, a second driver link is coupled to the second motor and to the second output link. The first output link and the second output link are also coupled to a connecting link. The connecting link exhibits a displacement force to control an angle of a control surface in an aircraft, or other vehicle, or equipment. A controller changes the control mode to enable a desired output state to be achieved in a normal operation or under a fault condition when one of the driver links is non-operational.

20 Claims, 9 Drawing Sheets

ACTUATOR ASSEMBLY WITH REDUNDANT DRIVERS AND LINKAGES TO MITIGATE FAULT CONDITIONS

CROSS-REFERENCE TO RELATED APPLICATIONS

This application claims priority to U.S. Provisional Application No. 63/384,677, filed on Nov. 22, 2022, which is incorporated by reference in its entirety.

BACKGROUND

Technical Field

The described embodiments relate to a servo-actuator configured to maintain functionality when one or more components jams, fails, or is otherwise unable to move.

Description of the Related Art

A servo-actuator converts source energy, such as electric, pneumatic, or hydraulic power, to motion at the servo-actuator output. For example, the servo-actuator converts source energy into translational movement or rotational movement at the servo-actuator output. To convert the source energy into movement, a servo-actuator includes a prime mover and a drivetrain. In various embodiments, the prime mover is a motor, and the drivetrain translates movement of the prime mover into motion of the servo-actuator output. Example drivetrains include gears and linkages coupling the prime mover to the servo-actuator output.

Various devices or systems include one or more servo-actuators to provide movement of one or more components of a device or of a system. For example, an aircraft includes one or more servo-actuators coupled to control surfaces, so movement from a servo-actuator repositions and/or reorients a control surface coupled to the servo-actuator. As another example, a launch vehicle couples a servo-actuator to a thrust vector, so movement from the servo-actuator controls the thrust vector. In other examples, a servo-actuator provides steering or braking in highway or off-highway vehicles or provides wrecking ball movement in construction equipment.

Some servo-actuators may include multiple prime movers to provide redundancy against failure of a prime mover. However, these configurations conventionally combine motion from the multiple prime movers through a drivetrain and therefore jamming of the drivetrain still prevents proper operation.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. Wherever practicable, similar or like reference numbers may be used in the figures and may indicate similar or like functionality.

An actuator assembly provides redundancy to maintain operation when a driver link is inoperable due to jamming or breakage of a prime mover, gear, link, or other drivetrain component. The actuator assembly includes a first motor and a second motor that each generate rotational forces. A first driver link is coupled to the first motor and to a first output link. Similarly, a second driver link is coupled to the second motor and to the second output link. The first output link and the second output link are also coupled to a connecting link. The connecting link is coupled to control an output state (e.g., position and/or orientation) of a control surface, such as a wing flap, aileron, or rudder of an aircraft. A controller detects when a fault condition occurs and changes a control mode of the actuator assembly for either normal operation or fault condition operation to enable the desired output state to be achieved.

Figure 1:
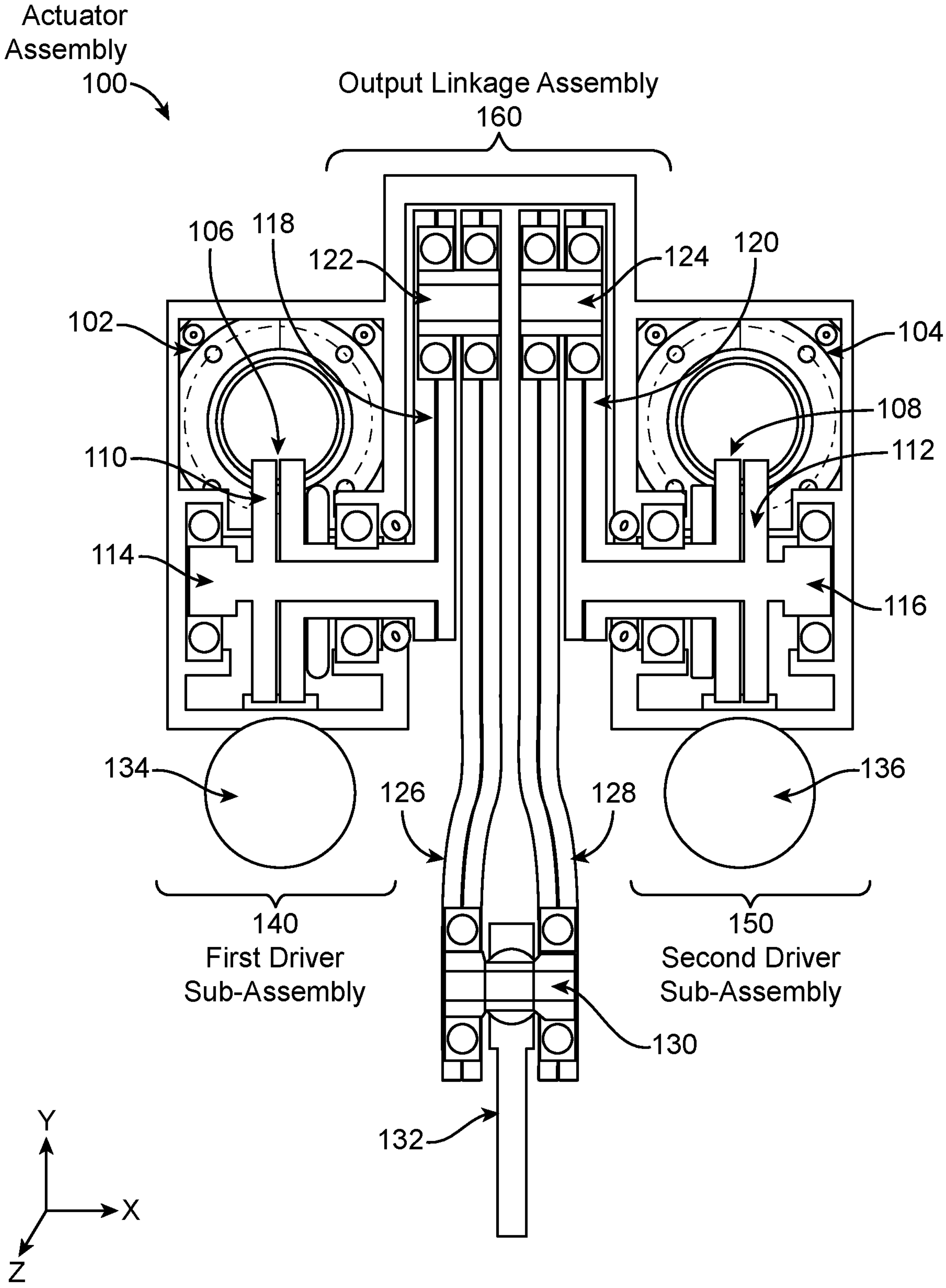
FIG. 1 is an example embodiment of an actuator assembly.

FIG. 1 illustrates an example embodiment of an actuator assembly 100. The actuator assembly 100 includes a first driver sub-assembly 140, a second driver sub-assembly 150, and an output linkage assembly 160. The first and second driver sub-assemblies 140, 150 generally drive a first drive shaft 114 and second drive shaft 116 respectively that are both coupled to the output linkage assembly 160. The first and second drive shafts 114, 116 may be substantially aligned such that they rotate about a common axis (e.g., an x-axis in the reference orientation). The output linkage assembly 160 operates to drive a connecting link 132 (that may be coupled to a control surface (not shown)) through a series of gears, cables, and/or linkages. The output linkage assembly 160 operates in a manner that enables continued operation in the event of jamming or failure of one of the driver sub-assemblies 140, 150.

The first driver sub-assembly 140 and the second driver sub-assembly 150 comprise a first motor 102 and a second motor 104 respectively that each convert power into rotational forces about the respective motor rotational axes (e.g., rotation in the x-y plane in the illustrated reference orientation). In various embodiments, the first motor 102 and the second motor 104 receive electrical power, hydraulic power, pneumatic power, or another type of power to convert into the rotational forces. While FIG. 1 shows an example actuator assembly 100 with two motors 102, 104, in other embodiments, the actuator assembly 100 may include three, four, or a greater number of motors, as further described below in conjunction with FIG. 2. Further, each of the motors 102, 104 may include control electronics for controlling a rotational speed or other operating characteristics of the motor. For example, the motors 102, 104 may be controlled based on control signals (e.g., from a controller) that can turn the motors 102, 104 on or off and control the power delivery to the motors, the rate of rotation, torque, or other parameters.

In the example of FIG. 1, the first driver sub-assembly 140 and the second driver sub-assembly 150 include respective worm gears 106, 108 and respective worm wheels 110, 112 that operate to translate rotation of the respective motors 102, 104 in a first rotation plane (e.g., the x-y plane) to rotation of respective drive shafts 114, 116 in a perpendicular rotational plane (e.g., a y-z plane). The worm gears 106, 108 may comprise a shaft with a spiral thread that engages with teeth on the respective worm wheels 110, 112. The rotational forces of the respective motors 102, 104 cause rotations of the respective worm gears 106, 108 against the respective worm wheels 110, 112. In response to the rotation, the spiral threads of the worm gears 106, 108 push on the teeth of the worm wheels 110, 112, changing the respective rotation planes by 90 degrees. Additionally, the combination of the worm gears 106, 108 and the worm wheels 110, 112 may reduce the rotational speed of the drive shafts 114, 116 relative to the motors 102, 104 to speeds suitable for driving other components of the actuator assembly 100, which are further described below. A circumference of the worm wheels 110, 112 determines an amount by which the rotational speeds are reduced, with a larger circumference of the worm wheels 110, 112 resulting in larger rotational speed reductions.

The respective driver sub-assemblies 140, 150 may furthermore include a first brake 134 and a second brake 136 respectively that operate to stop rotation of the respective drive shafts 114, 116 when the brakes 134, 136 are activated. The brakes 134, 136 may comprise solenoid-based brakes or other types of braking mechanism. In an embodiment, the brakes 134, 136 may be activated via an external control signal or may be activated by default unless actively disabled by a control signal.

The driver sub-assemblies 140, 150 may furthermore include respective sensors (not seen in FIG. 1) to enable detection of orientation of the respective drive shafts 114, 116 (e.g., rotation angle) and/or other parameters such as rotation rate, torque, etc.

The output linkage assembly 160 includes first and second driver links 118, 120, first and second bearing assemblies 122, 124, first and second output links 126, 128, and an output bearing assembly 130 that drive a connecting link 132. The driver links 118, 120 extend perpendicularly from the respective drive shafts 114, 116 such that they each rotate about an axis through the drive shafts 114, 116 like hands of a clock (i.e., rotate in respective y-z planes). The distal ends of the driver links 118, 120 thus travel along a circular or semi-circular path in response to the rotational forces of the motors 102, 104. The first and second driver links 118, 120 may be constructed to have substantially equivalent length.

In various embodiments, the first driver link 118 and the second driver link 120 are metal linkages. Alternatively, the first driver link 118 and/or the second driver link 120 are linkages made from composite materials or other types of materials. In an embodiment, the first worm wheel 110, first drive shaft 114, and first driver link 118 have a unibody construction. Alternatively, these components 110, 114, 118 may be separately constructed and mechanically coupled. The second worm wheel 112, second drive shaft 116, and second driver link 120 may similarly comprise either a unibody construction or may be separately constructed and mechanically coupled.

One or more of the first worm wheel 110, the first drive shaft 114, and the first driver link 118 may comprise a dual load path for rotating the first driver link 118 from the rotational force of the first motor 102. For example, the first motor 102 may rotate a dual-load worm wheel 110 (comprising a pair of worm wheels each coupled to the motor 102), that respectively rotates a dual-load drive shaft 114 (e.g., constructed via an inner shaft within an outer shaft) and a respective dual-load first driver link 118 (comprising a pair of links coupled to the inner and output shaft respectively). The second worm wheel 112, second drive shaft 116, and second driver link 120 may similarly comprise a dual load path. The brakes 134, 136 may be coupled in parallel to both load paths to enable the brakes 134, 136 to operate even if one load path fails. The dual load paths enable continued operation in the event of a failure within a single load path. Alternatively, these components may be implemented in single load paths.

The distal end of the first driver link 118 is coupled to a proximal end of a first output link 126 via a first driver bearing assembly 122 that enables rotation of the first output link 126 relative to the first driver link 118. Rotation may be constrained (e.g., using various stopping mechanisms) to a limited range of angles and may furthermore be constrained based on forces from other linkages described below. The distal end of the second driver link 120 is similarly coupled to a proximal end of a second output link 128 via a second driver bearing assembly 124 that enables constrained rotation of the second output link 128 relative to the second driver link 120. The first driver bearing assembly 122 and second driver bearing assembly 124 may each include, for example, ball bearing assemblies. In other embodiments, the driver bearing assemblies 122, 124 may comprise a pin or shaft that is coupled through a hole to enable rotation.

The first and second output links 126, 128 generally are of substantially the same length and construction. The first output link 126 and the second output link 128 may comprise metal linkages or may be made from composite materials or other types of materials. The output links 126, 128 may also each provide dual load paths, or other multiple load paths between the respective driver bearing assemblies 122, 124 and the output bearing assembly 130. Alternatively, the first output link 126 and/or the second output link 128 may comprise a single load path.

The first and second output links 126, 128 each couple to an output bearing assembly 130 that enables relative rotation (which may be constrained) of the first and second output links 126, 128 about the output bearing assembly 130. The output bearing assembly 130 further couples to a connecting link 132 that may rotate about the output bearing assembly 130. The connecting link 132 may comprise a rigid linkage, a cable, or other linkage to invoke a push or pull force of an output control surface as will further be described below.

FIG. 1 shows the cross section of the actuator assembly 100 in a "folded" configuration in order to illustrate the relevant components in a single cross-sectional plane. In operation, the first driver link 118 and second driver link 120 are generally offset from each other at different angles (e.g., in the y-z plane) about the rotational axis through the first and second drive shafts 114, 116. The first output link 126 and second output link 128 will similarly generally operate at different angles (e.g., in the y-z plane) relative to the output bearing assembly 130. Examples of operational configurations are described in further detail below with respect to FIGS. 3-6.

Figure 2:
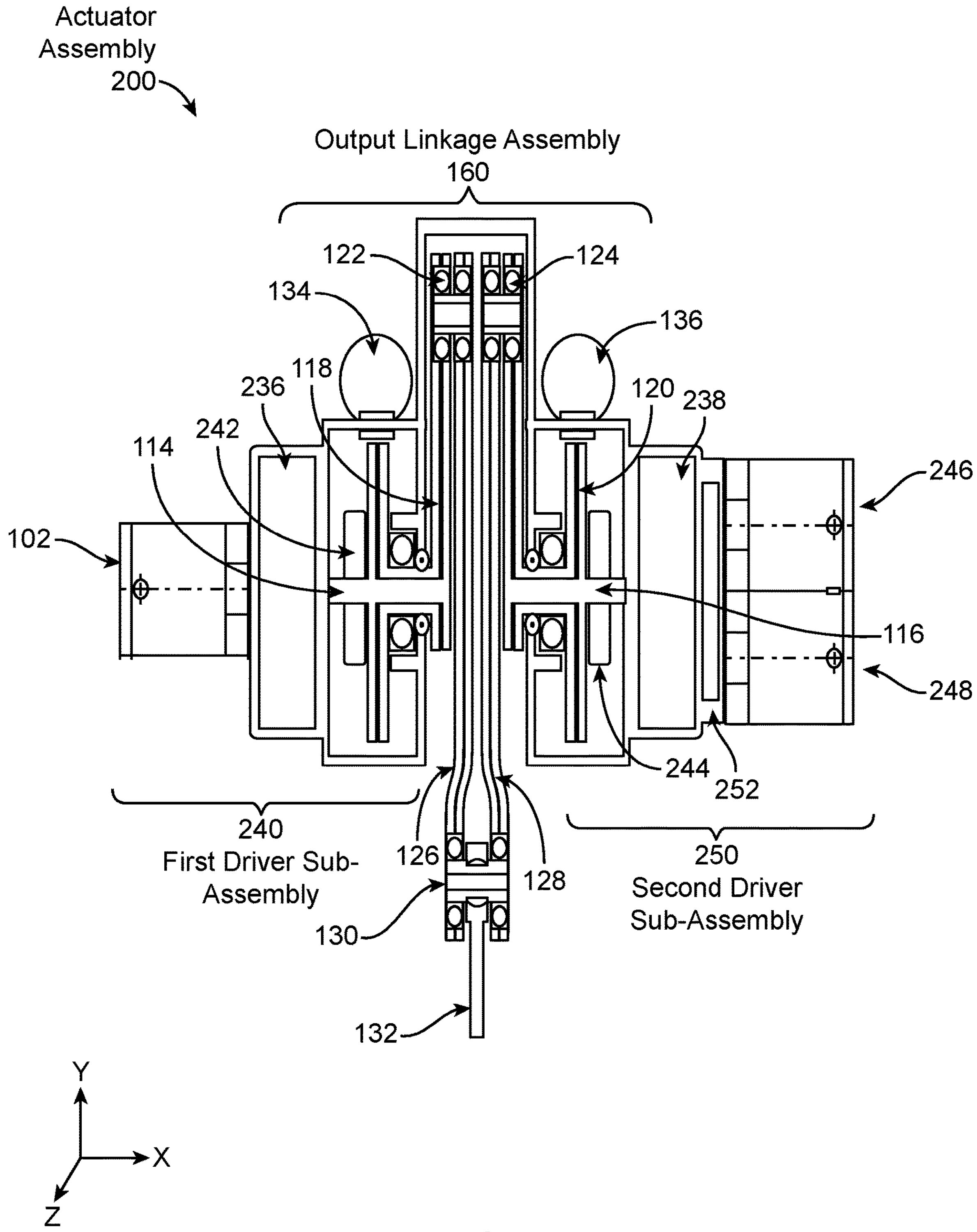
FIG. 2 is an example of an alternative embodiment of an actuator assembly.

FIG. 2 is an alternative embodiment of an actuator assembly 200. The embodiment of FIG. 2 includes a similarly constructed output linkage assembly 160 but includes different variations of the driver sub-assemblies 240, 250. In this example, the driver sub-assemblies 240, 250 are asymmetric with the first driver sub-assembly 240 having a different structure than the second driver sub-assembly 250.

The first driver sub-assembly 240 includes a first motor 102 a first gear reducer 236. The first gear reducer 236 reduces rotational speed of the first drive shaft 114 relative to the rotational speed of the motor 102. The first gear reducer 236 may comprise, for example, a planetary gear reducer, a compound planetary reducer, a harmonic drive gear reducer, or any other gear reducer configuration. The first driver sub-assembly furthermore 240 may include a first output position sensor 242 that senses a rotational position of the drive shaft 114 and may provide feedback to a controller of the first motor 102 to adjust the motor operation based on the sensed position. For example, the controller may change power output to the motor 102 to move the drive shaft 114 to a desired rotational position. In this example, the first motor 102 is in an orientation rotated 90 degrees relative to the orientation in FIG. 1, such that it directly drives the first drive shaft 114 via the gear reducer 236 without rotational translation (i.e., both the motor 102 and the first drive shaft 114 rotate in a y-z plane). Thus, the worm gear 106 and worm wheel 110 described in FIG. 1 may be omitted in this embodiment.

The second driver sub-assembly 250 includes dual motors (e.g., a second motor 246 and a third motor 248), a torque sum gearbox 252, a second gear reducer 238, and a second output position sensor 244. The torque sum gearbox 252 includes gears or other components configured to combine the rotational forces of the dual motors 246, 248 to jointly drive the second drive shaft 116. The second gear reducer 238 and output position sensor 244 operate similarly to the first gear reducer 236 and first output position sensor 242 described above. In the event that one of the dual motors 246, 248 fails, the remaining motor may still operate to effectively drive the second drive shaft 116, thereby enabling the actuator assembly 100 to remain operational.

While FIG. 2 shows an embodiment where three total motors 102, 246, 248 are present, in other embodiments the actuator assembly 100 may include two motors (e.g., with both driver sub-assemblies 240, 250 having the configuration of the first driver sub-assembly 240), four motors (e.g., with both driver sub-assemblies 240, 250 having the configuration of the second driver sub-assembly 250), or another number of motors. Furthermore, the driver sub-assemblies 240, 250 may be symmetrically or asymmetrically configured using any combination of the driver sub-assemblies 140, 150, 240, 250 described in FIGS. 1-2 or other driver configuration for generating output drive forces for a pair of drive shafts 114, 116. While the description of operation below may refer to the driver assembly 100 with the driver sub-assemblies 140, 150, operations may similarly apply to the driver assembly 200 (with driver sub-assemblies 240, 250) or any of the other variations with different types and combinations of driver sub-assemblies described herein.

Figure 3:
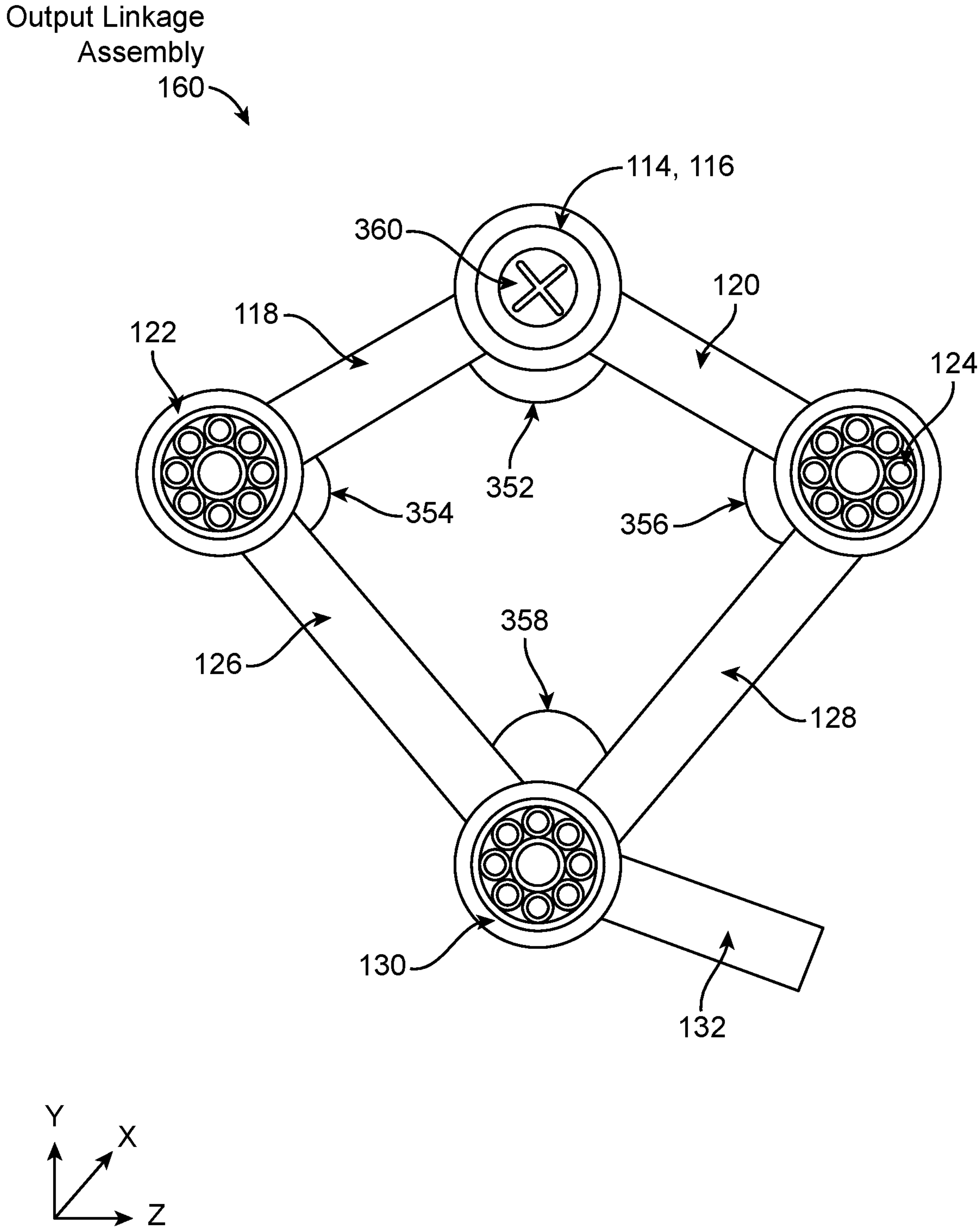
FIG. 3 is an example embodiment of an output linkage assembly of an actuator assembly.

FIG. 3 shows another example view of the output linkage assembly 160. This view is rotated 90 degrees about the y-axis relative to the views of FIGS. 1-2 as indicated by the reference orientation axes. The components in this view are not all in the same y-z plane, and thus the figure represents multiple overlaid cross-sections. For example, the first driver link 118, first driver bearing assembly 122, and first output link 126 may be offset in the x-direction from the second driver link 120, second driver bearing assembly 124, and second output link 128. Furthermore, unlike FIGS. 1-2, where the various links 118, 120, 126, 128 were shown in a folded configuration aligned in parallel to a y-axis, FIG. 3 instead shows the output linkage assembly 160 with the driver links 118, 120 rotated to different respective angles relative to the drive shafts 114, 116, and the output links 126, 128 similarly assuming different angles relative to the output bearing assembly 130. This configuration may be representative of an operational configuration of the output linkage assembly 160 as will be further described below.

Consistent with the description in FIG. 1, a proximal end of the first driver link 118 is coupled to the first drive shaft 114 such that the first driver link 118 rotates about a rotation axis 360 based on first rotational force from a first motor 102 (either directly or through one or more translations to the plane of rotation). Similarly, a proximal end of the second driver link 120 is coupled to the second drive shaft 116 such that the second driver link 120 rotates about the same rotational axis 360 based on the second rotational force from a second motor 104. A driver link angle 352 is thus formed between the respective driver links 118, 120.

A distal end of the first driver link 115 is coupled to a proximal end of a first output link 135 via the first driver bearing assembly 122 and form a first driver bearing angle 345. Similarly, a distal end of the second driver link 120 is coupled to a proximal end of the second output link 128 via the second driver bearing assembly 124 and form a second driver bearing angle 350. The respective distal ends of the first output link 126 and the second output link 128 respectively are coupled to the output bearing assembly 130, thus forming an output link angle 358. The output bearing assembly 130 is coupled to the connecting link 132. Operation of the output linkage assembly 160 is further described with respect to a set of simplified diagrams in FIGS. 4-5D.

Figure 4:
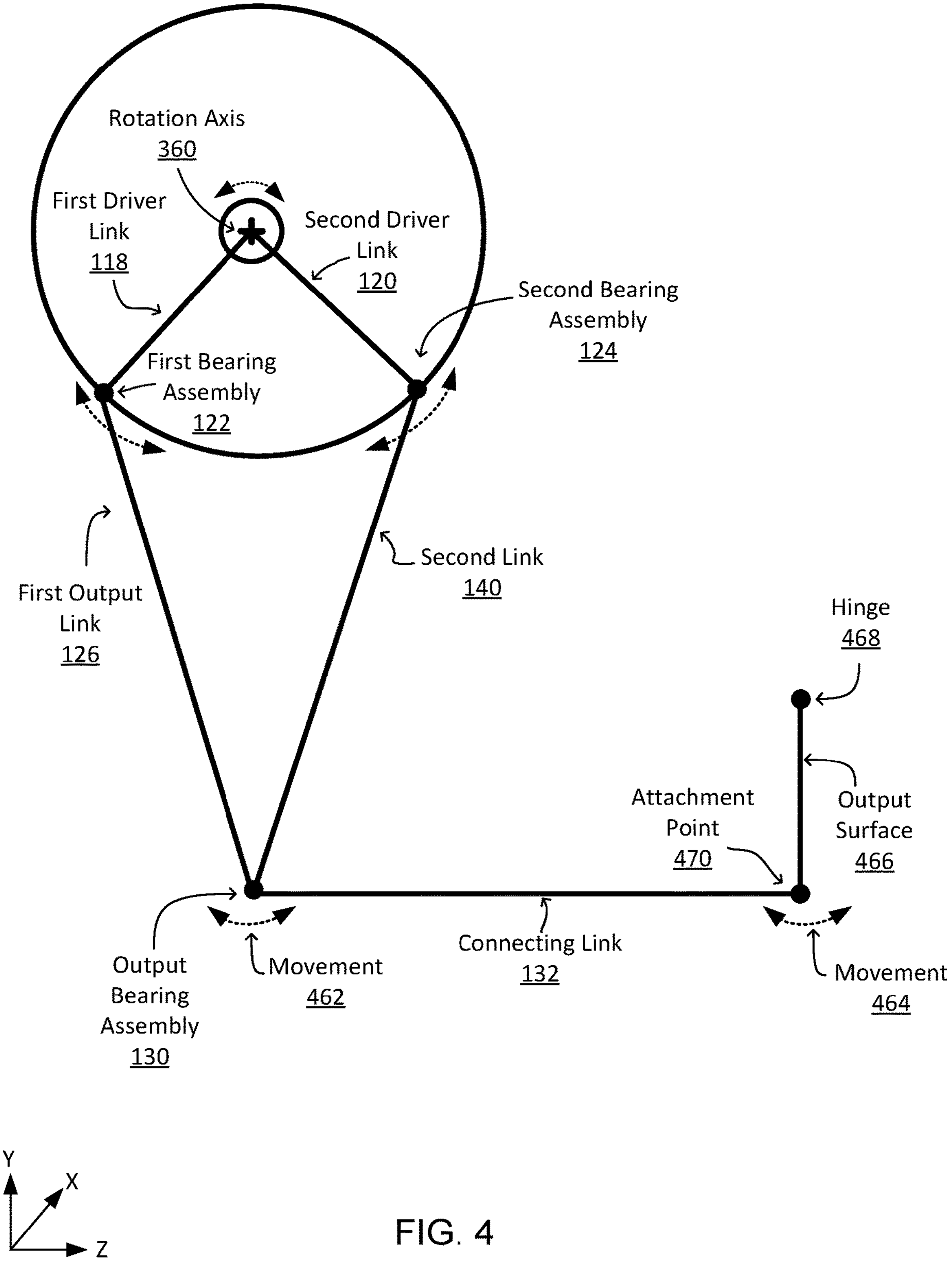
FIG. 4 is a conceptual diagram showing operation of an example embodiment of an actuator assembly.

FIG. 4 is a conceptual diagram showing operation of the actuator assembly (such as the actuator assembly 100) during normal operation without failures under an active-active control scheme in which both driver sub-assemblies 140, 150 normally operate together to control the output state. In this normal operation, the respective driver sub-assemblies 140, 150 operate to rotate the first and second driver links 118, 120 in unison at substantially the same rate and in a manner that maintains a substantially constant driver link angle 352. The first and second driver bearing angles 345, 350 are furthermore maintained substantially equal and constant, and the output link angle 358 also remains constant. Rotation of the drive shafts 114, 116 about the rotational axis 360 thus causes the output bearing assembly 130 to exhibit movement 462 along an arc of a circular path centered at the rotational axis 360. The movement 462 of the output bearing assembly pushes or pulls the connecting link 132 causing similar movement 464 of an attachment point 470 of an output surface 466 such as a bell crank. The distal end of the output surface 466 may be fixed to hinge 415 such that the movement 464 from the force of the connecting link 132 changes the angle of the output surface 466 about the hinge 468. Thus, by controlling rotations of the respective drive shafts 114, 116 in a coordinated manner, the displacement of the attachment point 470 and the angle of the output surface 466 may be controlled. Because the angles 352, 354, 356, 358 between adjacent pairs of links 118, 1120, 126, 128 do not change during normal operation, there is beneficially little mechanical wear on the bearings 122, 124, 130. Therefore, the design of the bearings 122, 124, 130 may be optimized for backlash without significantly sacrificing their operational lifetime due to wear.

In other embodiments, the output surface 466 is not necessarily hinged, and the connecting link 132 may instead operate to achieve a desired displacement of the attachment point 470 through movement 464 along a constrained path. In various embodiments, different securing or stopping mechanisms may be employed to constrain the motion of the connecting link 132, attachment point 470, and/or output surface 466 within a limited path, range of angles, or displacement range.

Figure 5A:
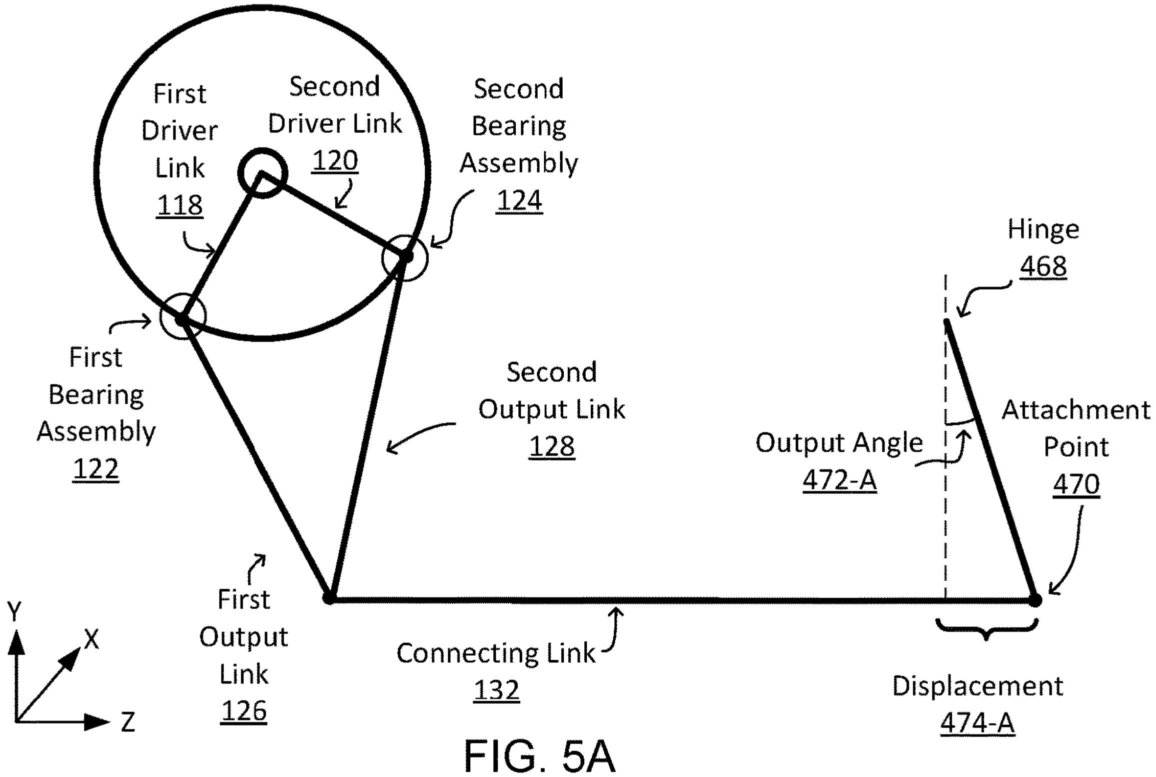
FIG. 5A is a conceptual diagram of operation of an example embodiment of an actuator assembly achieving a first output state in a normal operation mode.
Figure 5B:
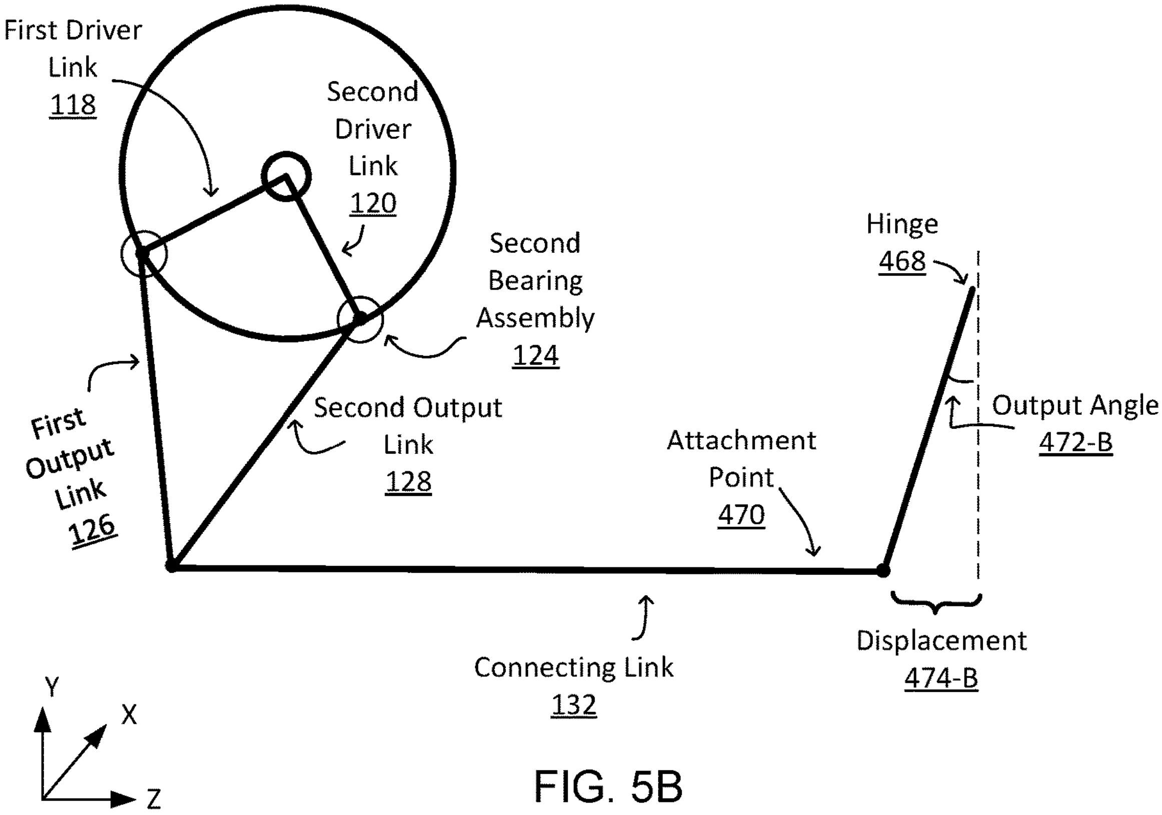
FIG. 5B is a conceptual diagram of operation of an example embodiment of an actuator assembly achieving a second output state in a normal operation mode.

FIGS. 5A-B conceptually illustrate normal operation of the actuator assembly 100 under an active-active control scheme where both the first driver link 118 and the second driver link 120 are driven to different respective rotation angles (based on a control signal) about the rotation axis 360 (while maintaining the respective driver link angle, 352, driver output bearing angles 354, 356, and output bearing angle 358), thus achieving different displacements 474 of the attachment point 470 and corresponding output angles 472 relative to a reference orientation. For example, FIG. 5A illustrates a first example orientation of the driver links 118, 120 that causes the attachment point 470 to be displaced by a first displacement 474-A and results in a first output angle 472-A of a hinged output surface. In FIG. 5B, the first driver link and second driver links 118, 120 are rotated to different positions, which results in a second displacement 474-B of the attachment point 470 and corresponding output angle 472-B of the hinged output surface.

In various embodiments, the range of motion of the first and second driver links 118, 120 may be limited depending on the desired range of displacement 474 and/or output angle 472 desired. Different translations between the driver shaft angle and the displacement 474 and/or output angle 472 may also be achieved based on selection of different physical parameters such as the lengths of the driver links 118, 120, the output links 126, 128, and the connecting link 132, or the relative lengths between these components.

Figure 5C:
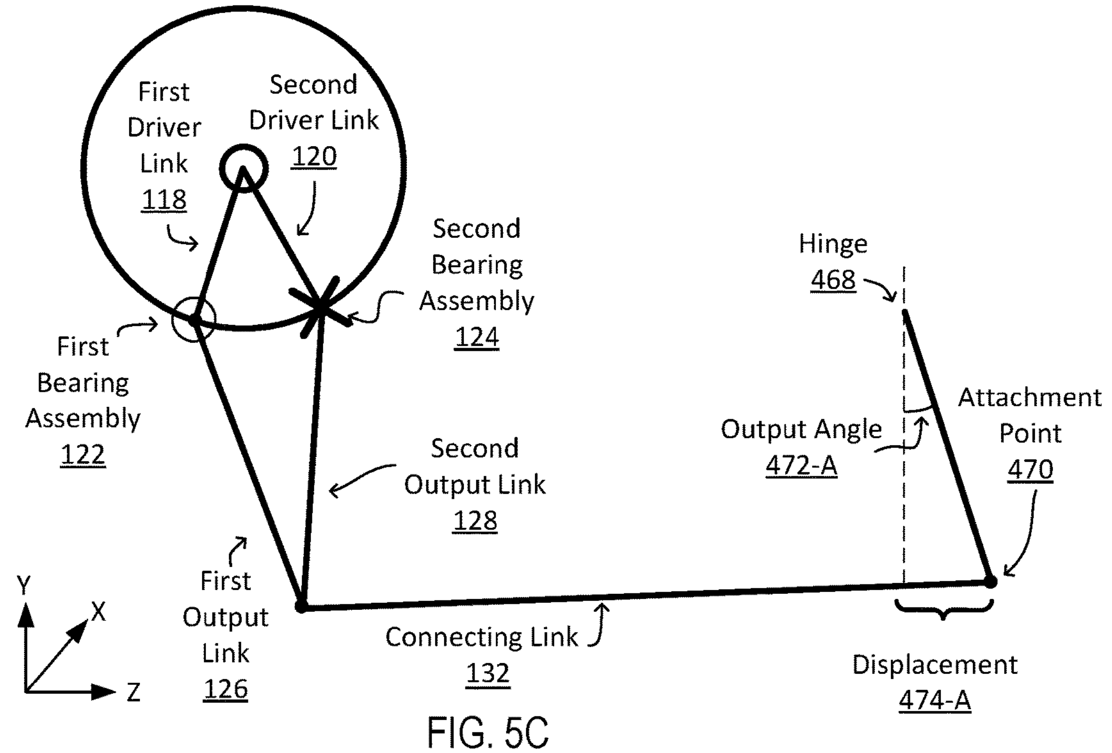
FIG. 5C is a conceptual diagram of operation of an example embodiment of an actuator assembly achieving the first output state in a fault condition mode.
Figure 5D:
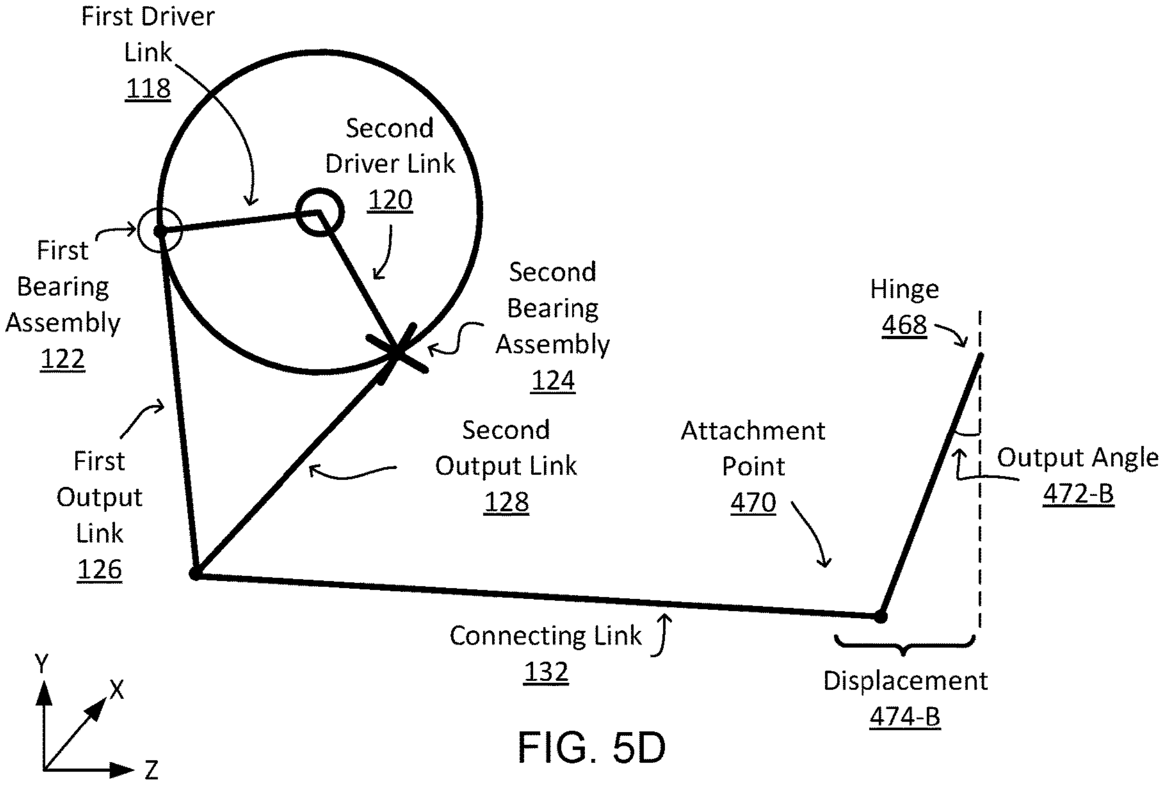
FIG. 5D is a conceptual diagram of operation of an example embodiment of an actuator assembly achieving the second output state in the fault condition mode.

FIGS. 5C-D conceptually illustrate operation of the actuator assembly 100 when one of the driver links 118, 120 fails to rotate (the second driver link 120 in this example). Failure may be due to failure of a motor 104, breakage or jamming of gears or links in the sub-driver sub-assembly 150, or breakage or jamming of the driver link 120 or driver bearing assembly 124 such that the driver link 120 does not rotate responsive to a control signal. For example, as illustrated in both FIGS. 5C and 5D, the second driver link 120 is jammed at a worst case angle. Nevertheless, the actuator assembly 100 may continue to function by appropriately controlling the first driver link 118 to achieve the desired output angle 472 and/or displacement 474. For example, FIG. 5C illustrates a configuration for achieving the same displacement 474-A and output angle 472-A as FIG. 5A even when the second driver link 120 is jammed at a different position than under the normal operating position for this output state shown in FIG. 5A. In this case, the first driver link 118 is driven such that the driver link angle 352 is relatively smaller compared to the nominal driver link angle 352 under normal operating conditions. As can be seen, the first driver link 118 is driven to a different rotational position in FIG. 5C than in FIG. 5A to compensate for the second driver link 120 being non-operational.

In FIG. 5D, a configuration for achieving the same output state (e.g., displacement 474-B and output angle 472-B) as FIG. 5B is illustrated when the second driver link 120 is jammed at the same position as in FIG. 5C. In this case, the first driver link 118 is driven to a different angular position that results in a relatively larger driver link angle 352 compared to the nominal driver link angle 352 under normal operating conditions as shown in FIG. 5B. Generally, the operating driver link 118 may be controlled to traverse a greater range of motion for the same change in displacement 474 or output angle 472 when the second driver link 120 is non-operative relative to when both driver links 118, 120 are operative.

Figure 6:
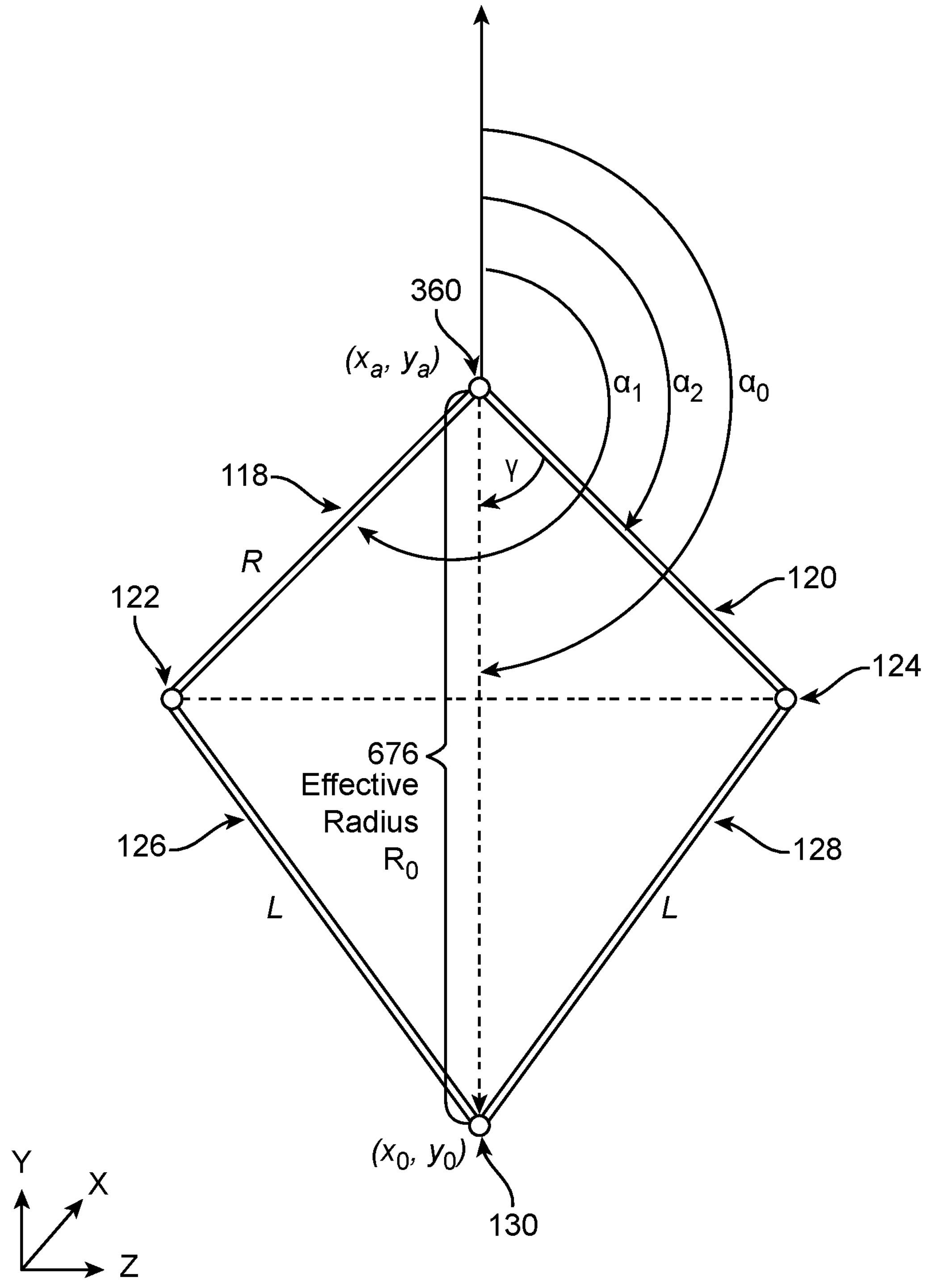
FIG. 6 is a conceptual diagram illustrating geometry of an output linkage assembly relevant to various control signals.

FIG. 6 is a conceptual diagram illustrating a technique for determining an effective radius 600 of an actuator assembly 100 under an active-active control scheme, which affects the control scheme for controlling the position of the output bearing assembly 130 relative to the rotation angle of the drive shafts 114, 116. FIG. 6 shows the first driver link 118 and the second driver link 120 with a common length, denoted as R. Similarly, the first output link 126 and the second output link 128 have a common length, denoted as L. A nominal output bearing angle is represented as $\alpha_0$, which represents an angle of the output bearing assembly 130 relative to a reference line through the rotational axis 360 of the drive shafts 114, 116. A first driver link angle $\alpha_1$ represents an angle of the first driver link 118 and a second link angle $\alpha_2$ represents an angle of the second driver link 120. An angle $\gamma$ represents a middle angle halfway between the first and second driver link angles $\alpha_1$, $\alpha_2$. The effective radius $R_0$ 676 is determined as:

$$R_o = R\cos\gamma + \sqrt{L^2 + R^2(\sin\gamma)^2}$$

The position of the output bearing assembly 130 may be determined relative to the drive shafts 114, 116 at $(x_a, y_a)$ as:

$$(x_0, y_0) = (x_a + R_o\sin\alpha_0,\ y_\alpha + R_o\cos\alpha_0) \tag{2}$$

The above relationships, as well as the specific geometry of the connecting link 132 and control surface may be utilized to derive control parameters for achieving desired output states (which may be specified in terms of displacement, angle, or both during normal operations (where $\alpha_1$, $\alpha_2$ can be controlled to maintain a fixed relationship) and during fault condition operations (where either $\alpha_1$ or $\alpha_2$ become jammed and only one of the angles $\alpha_1$, $\alpha_2$ can be freely controlled). Generally, the operational driver link angle $\alpha$ will be controlled to exhibit larger changes to achieve the same change in output state when a single driver link is operational relative to when both links are operational.

In other embodiments, different geometries may be utilized. For example, the driver links 118, 120 and/or output links 126, 128 may have asymmetric lengths and/or the drive shafts 114, 116 may be aligned in different rotational planes. A controller may generate appropriate control signals to achieve the desired output state dependent on the specific geometry of the output linkage assembly 160.

The above description includes an active-active control scheme of an actuator assembly 100 in which both driver sub-assemblies 140, 150 (and associated links and bearings) are active in the absence of a fault condition. In an alternative implementation, the above-described actuator assembly 100 may operate in an active-standby control scheme in which only one of the driver sub-assemblies 140, 150 is active even when both are potentially operational. When a fault condition occurs, control may switch to the operational driver sub-assembly. For example, in normal operation of an active-standby control scheme, a controller may control rotation of the first driver link 118 (and associated components) in a manner that achieves the desired output state when the second driver link 120 is set to a fixed stationary position. If the first driver link 118 fails, the controller may instead drive the second driver link 120 in a manner that achieves the desired output state.

Figure 7:
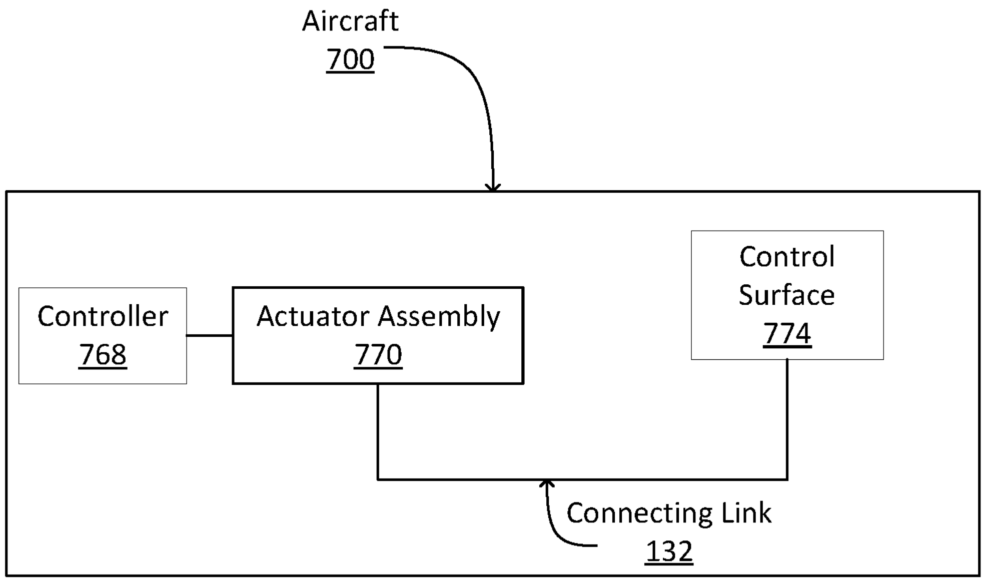
FIG. 7 is a block diagram of an example aircraft system that incorporates an actuator assembly for controlling an output state of a control surface.

FIG. 7 illustrates a simplified block diagram that shows an actuator assembly 770 (e.g., the actuator assembly 100 or 200) in the context of an aircraft 700 in which the actuator assembly 770 controls a control surface 774 based on signals from a controller 768. The controller 768 may comprise a hardware controller (e.g., including digital logic and/or analog electronics) and/or may comprise a software-based controller that operates by causing a processor to execute instructions stored to a computer-readable storage medium. The controller 768 may receive inputs from a flight system and may also receive feedback from various sensors (e.g., position sensor 242, 244) of the actuator assembly 770 that enable sensing of the corresponding rotational angles of the driver links 118, 120. The feedback signals may furthermore operate to detect when a fault occurs, such as when one of the driver links 118, 120 fails to rotate in the expected manner in response to the control signals.

In response to the feedback signals and/or input control signals, the controller 768 generates driver control signals that control power delivery to the motors 102, 104. For example, the controller 768 may generate a first driver sub-assembly control signal for the first driver sub-assembly 140 and a second driver sub-assembly control signal for a second driver sub-assembly 150. As described above, during normal operation of an active-active configuration, the controller 768 may cause the driver links 118, 120 to rotate in a coordinated manner to maintain various angles 352, 354, 356, 358 as substantially constant (i.e., the driver links 118, 120 move in unison). Hence, the driver links 118, 120 move in the same direction and by the same amount under normal operating conditions. Based on the overall geometry of the output linkage assembly 160, the connecting link 132, and the control surface 774, the controller 768 may generate signals to achieve a desired output orientation of the control surface 774. In normal operation of an active-standby configuration, the controller 768 may control one of the driver links 118, 120 while holding the other driver link 118, 120 stationary.

The controller 768 may furthermore detect when a fault condition occurs and may switch operation to a fault condition mode. Here, the controller 768 modifies the control scheme to control the operational driver link in a manner that achieves the desired output state of the control surface 774. As described above, in the active-active control scheme, the change in angle of the operational driver link to achieve the same change in output state of the control surface 774 is different in the fault mode than in the normal operating mode, and generally includes moving the operational driver link over a wider range of angles to achieve the same change in output angle. The specific control parameters are dependent on the geometries of the actuator assembly 770 and control surface 774 as described above. In an embodiment, different mappings between a desired output angle of the control surface 774 and the control inputs that achieve those angles may be preconfigured and stored in the controller 768 for each of the normal operating mode and the fault condition mode. In the active-standby control scheme, the controller 768 may control whichever driver link 118, 120 is operational to achieve the desired output state in the event of a fault condition.

The controller 768 may furthermore generate control signals for controlling one or more brakes 134, 136 of the actuator assembly 100 in response to detecting the fault condition. For example, the controller 768 may activate a brake corresponding to a non-operational driver link 120 to prevent movement that cannot be sufficiently controlled by the controller 768.

In an aircraft 700, the connector link 132 may comprise a rigid link that directly applies a force to a bell crank or other attachment point of a control surface 774 to cause a change in angle of the surface 774. Alternatively, the connecting link 132 may include one or more cables (or cable assemblies) that connect directly or indirectly to the control surface 774 to control a displacement and/or an angle of a hinged surface. Example systems may furthermore include one or more pulleys, bell cranks, or other components that operate to translate motion of the actuator assembly 770 to a desired motion.

The control surface 720 may comprise an element associated with flight control of the aircraft 700. Examples of the control surface 720 include an aileron, an elevator, a rudder, a wing flap, or other controllable surfaces.

Figure 8:
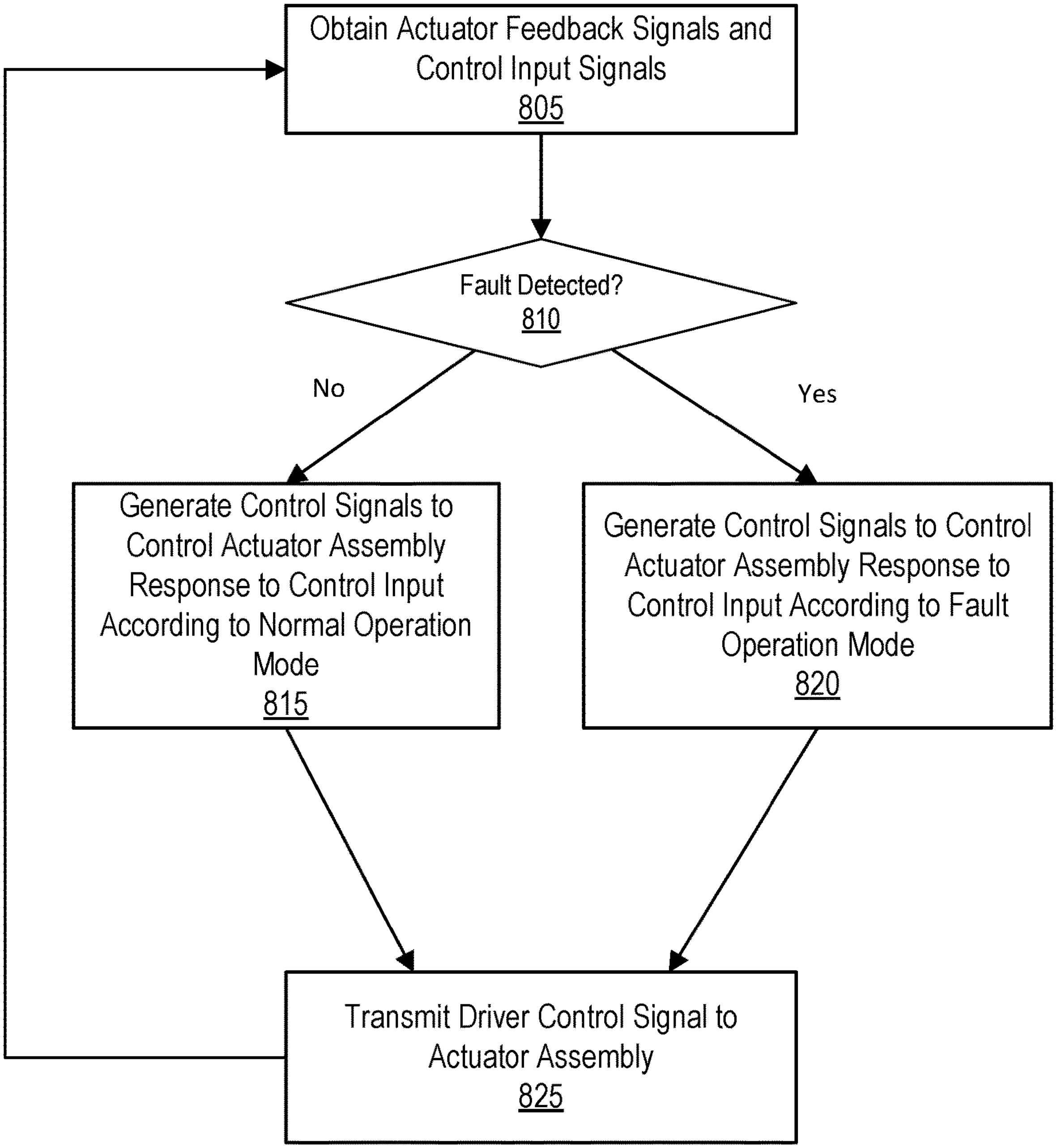
FIG. 8 is a flowchart of an example embodiment of a method for controlling an actuator assembly.

FIG. 8 is a flowchart of one embodiment of a method for controlling operation of an actuator assembly 100. A controller 768 obtains 805 control inputs (e.g., from a flight system) and feedback signals indicative of operation of the actuator assembly 100. Based on the input signals, the controller 768 determines 810 if a fault condition is detected. Here, a fault condition may be detected when the position of one of the driver links 118, 120 as sensed by sensors 242 or 244, is inconsistent with the expected position based on the control inputs, or other signals indicative of a driver link 118, 120 or another component (e.g., motors 102, 104, drive shafts 114, 116, etc.) being jammed, broken, or otherwise non-operational. If no fault condition is detected, the controller 768 generates 815 control signals (e.g., a first driver sub-assembly control signal for the first driver sub-assembly 140 and a second driver sub-assembly control signal for second driver sub-assembly 150) for operating the actuator assembly 100 according to a normal operation mode as described above to achieve a desired output state of a control surface 774 consistent with the input control signals. In an active-active configuration, the normal operation mode may generally include controlling the respective driver links 118, 120 to operate in unison to move by the same amount and in the same direction to maintain the driver link angle 352 between them. In an active-standby configuration, the normal operation mode may generally include controlling only one of the driver links to achieve the desired output state. If the controller 768 instead detects a fault condition, the controller 768 may switch operation to a fault mode in which it generates 820 control signals for controlling the operational driver link is individually controlled to achieve the desired orientation of the control surface 774. Under the active-active control scheme, the fault mode may involve controlling the operational driver link over a wider range of angles to achieve the same state change (e.g., displacement and/or angle) in the control surface 774 as described above (with specific parameters dependent on the geometries of the various elements). The controller 768 then transmits the generated control signals to the actuator assembly 100. The process may repeat periodically to enable continuous feedback and control.

In other embodiments, the described actuators, control system, and control methods may be applied in various types of flight vehicles such as airplanes, helicopters, drones, gliders, or other aircrafts and may be used to drive various elements intended to exhibit a displacement, change in angle, or combination thereof in response to a control signal. In other embodiments, the described actuators, control system, and control methods may be used in other systems such as for thrust-vector control of launch vehicles, steering and braking control systems of road or off-road vehicles, or the vehicle control systems. In yet further embodiments, the described actuators, control system, and control methods may be employed to control various control systems in other types of land vehicles, space vehicles, aquatic vessels, or other vehicles. In further embodiments, the described actuator, control system, and control method may be utilized to control elements of construction equipment such as driving motion of a wrecking ball or other moving elements.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe various control processes in terms of algorithms and symbolic representations of operations on information. These operations, while described functionally, computationally, or logically, may be implemented by computer programs or equivalent electrical circuits, microcode, or any combination thereof. Any of the steps, operations, or processes described herein (e.g., in the controller 768) may be performed or implemented with one or more hardware or software modules, alone or in combination with other devices. Embodiments may also relate to an apparatus for performing the operations herein. This apparatus may be specially constructed for the described purposes, and/or it may include a general-purpose computing device selectively activated or reconfigured by a computer program stored in the computer. Such a computer program may be stored in a tangible non-transitory computer readable storage medium or any type of media suitable for storing electronic instructions and coupled to a computer system bus. Furthermore, any computing systems referred to in the specification may include a single processor or may include architectures employing multiple processor designs for increased computing capability.

Finally, the language used in the specification has been principally selected for readability and instructional purposes, and it may not have been selected to delineate or circumscribe the inventive subject matter. It is therefore intended that the scope is not limited by this detailed description, but rather by any claims that issue on an application based hereon. Accordingly, the disclosure of the embodiments is intended to be illustrative, but not limiting, of the scope of the invention, which is set forth in the following claims.

What is claimed is:

1. An actuator assembly comprising:

a first driver sub-assembly to generate a first rotational force of a first drive shaft about a drive shaft rotational axis;

a first driver link having a proximate end coupled to the first drive shaft and configured, when operational, to rotate in a first plane perpendicular to the drive shaft rotational axis in response to the first rotational force;

a first driver bearing assembly coupled to a distal end of the first driver link;

a first output link having a proximate end coupled to first driver bearing assembly;

a second driver sub-assembly to generate a second rotational force of a second drive shaft about the drive shaft rotational axis;

a second driver link having a proximate end coupled to the second drive shaft and configured, when operational, to rotate in a second plane perpendicular to the drive shaft rotational axis in response to the second rotational force;

a second driver bearing assembly coupled to a distal end of the second driver link;

a second output link having a proximate end coupled to second driver bearing assembly;

an output bearing assembly coupled to distal ends of the first output link and the second output link, wherein the output bearing assembly is configured to move along an arc responsive to rotation of at least one of the first driver link and the second driver link; and a connecting link coupled to the output bearing assembly to generate an output force based on motion of the output bearing assembly.

2. The actuator assembly of claim 1, wherein the connecting link is configured to apply the output force to an attachment point of a control surface to cause a change in angle of the control surface relative to a hinge.

3. The actuator assembly of claim 1, wherein the first driver sub-assembly comprises:

at least one motor; and at least one gear element to translate a motor rotational force of the at least one motor to the first rotational force of the first drive shaft.

4. The actuator assembly of claim 3, wherein the motor rotational force is about a motor rotational axis in a plane perpendicular to a plane of the drive shaft rotational axis;

wherein the at least one gear element comprises:

a worm gear coupled to the at least one motor; and a worm wheel coupled to the worm gear, wherein the worm gear and the worm wheel operate to translate the motor rotational force to the first rotational force of the first drive shaft.

5. The actuator assembly of claim 3, wherein the at least one gear element comprises:

a gear reducer to reduce a rotational speed of the first drive shaft relative to a rotational speed of the at least one motor.

6. The actuator assembly of claim 3, wherein the at least one gear element comprises:

a torque sum gearbox to output a combined rotational force of two or more motors.

7. The actuator assembly of claim 1, wherein the first driver sub-assembly further comprise a first positional sensor to a sense a first rotation angle of the first driver link; and wherein the second driver sub-assembly further comprise a second positional sensor to a sense a second rotation angle of the second driver link.

8. The actuator assembly of claim 1, wherein when both the first driver link and the second driver link are operational, the first driver link and the second driver link are controlled to rotate in unison and maintain a substantially fixed driver link angle between the first driver link and the second driver link, and wherein a control signal controls the first driver link and the second driver link in a normal operation mode to achieve an output state of a control surface coupled to the connecting link.

9. The actuator assembly of claim 8, wherein when the first driver link is operational and the second driver link is non-operational, the first driver link is controlled in a fault condition mode to achieve the output state of the control surface coupled to the connecting link.

10. The actuator assembly of claim 9, wherein the first driver link is controlled to undergo a large angular change to achieve a desired angular change of the control surface when in the fault condition mode relative to the normal operation mode.

11. The actuator assembly of claim 1, wherein when at least the first driver is operational, the second driver link remains stationary and the first driver link is controlled to rotate according to a control signal to achieve an output state of a control surface coupled to the connecting link; and wherein when the first driver link is non-operational, the second driver link is controlled to rotate according to the control signal to achieve the output state of the control surface coupled to the connecting link.

12. The actuator assembly of claim 1, wherein the first driver bearing assembly, the second driver bearing assembly, and the output bearing assembly comprise respective ball bearing assemblies.

13. The actuator assembly of claim 1, further comprising:

a first brake coupled to the first driver link, the first brake configured to stop movement of the first driver link in response to a first control signal; and a second brake coupled to the second driver link, the second brake configured to stop movement of the second driver link in response to a second control signal.

14. A control system for an aircraft comprising:

a controller to receive an input flight control signal and to generate at least a first driver sub-assembly control signal and a second driver sub-assembly control signal responsive to the input flight control signal;

an actuator assembly comprising:

a first driver sub-assembly to generate a first rotational force of a first drive shaft about a drive shaft rotational axis in response to the first driver sub-assembly control signal;

a first driver link having a proximate end coupled to the first drive shaft and configured, when operational, to rotate in a first plane perpendicular to the drive shaft rotational axis in response to the first rotational force;

a first driver bearing assembly coupled to a distal end of the first driver link;

a first output link having a proximate end coupled to first driver bearing assembly;

a second driver sub-assembly to generate a second rotational force of a second drive shaft about the drive shaft rotational axis;

a second driver link having a proximate end coupled to the second drive shaft and configured, when operational, to rotate in a second plane perpendicular to the drive shaft rotational axis in response to the second rotational force;

a second driver bearing assembly coupled to a distal end of the second driver link;

a second output link having a proximate end coupled to second driver bearing assembly;

an output bearing assembly coupled to distal ends of the first output link and the second output link, wherein the output bearing assembly is configured to move along an arc responsive to rotation of at least one of the first driver link and the second driver link; and a connecting link having a proximal end coupled to the output bearing assembly; and a control surface coupled to a distal end of the connecting link at an attachment point, wherein the attachment point is displaced based on an output force of the connecting link to achieve an output displacement.

15. The aircraft of claim 14, wherein the control surface is selected from a group consisting of: an elevator, an aileron, and a rudder.

16. The aircraft of claim 14, further comprising:

a bell crank coupled to between the connecting link and the control surface, the bell crank configured to convert the output force of the connecting link to rotational motion of the attachment point of the control surface about a hinge to change an angle of the control surface.

17. The aircraft of claim 14, further comprising:

a cable assembly including a cable coupled between the connecting link and an attachment point of the control surface, the cable to convert the output force of the connecting link to rotational motion of the attachment point of the control surface about a hinge to change an angle of the control surface.

18. The aircraft of claim 14, wherein the controller is configured to detect when both the first driver link and the second driver link are operational, and to generate the first driver sub-assembly control signal and the second driver sub-assembly control signal to control the first driver link and the second driver link to rotate in unison and maintain a substantially fixed driver link angle between the first driver link and the second driver link, and wherein the controller is further configured to control the first driver link and the second driver link in a normal operation mode to achieve the output displacement based on the input flight control signal.

19. The aircraft of claim 18, wherein the controller is configured to detect when the first driver link is operational and the second driver link is non-operational; and wherein the controller is configured to control the first driver link in a fault condition mode to achieve the output displacement based on the input flight control signal.

20. A method for controlling an actuator assembly for an aircraft, the method comprising:

obtaining, by a controller, a control input signal for controlling an output state of a control surface and obtaining one or more feedback signals indicative of an operational status of a first driver link driven by a first driver sub-assembly and a second driver link driven by a second driver sub-assembly, wherein the first driver link and the second driver link are coupled to a first output link and second output link respectively, and wherein the first output link and the second output link are jointly coupled to a connecting link coupled to the control surface;

responsive to the one or more feedback signals indicating a normal operating condition of the first driver link and the second driver link, generating a first driver sub-assembly control signal and a second driver sub-assembly control signal that achieves the output state of the control surface specified in the control input signal by controlling the first driver link and the second driver link to rotate in unison and maintain a substantially fixed driver link angle between the first driver link and the second driver link; and responsive to the one or more feedback signals indicating a fault condition of the first driver link, generating, by the controller, the first driver sub-assembly control signal to achieve the output state of the control surface specified in the control input signal by controlling the first driver link independently of the second driver link.

* * * * *